United States Patent [19]

Colbachini

[11] Patent Number: 4,737,230
[45] Date of Patent: Apr. 12, 1988

[54] SYSTEM FOR THE PRODUCTION OF RUBBER TUBES

[76] Inventor: Giuseppe A. Colbachini, Via Fossona 77, 35030 Cervarese S. Croce (Padova), Italy

[21] Appl. No.: 927,268
[22] Filed: Nov. 4, 1986
[30] Foreign Application Priority Data Nov. 20, 1985 [IT] Italy .............................. 22906 A/85

[51] Int. Cl.$^4$ .................................................. B29C 53/62
[52] U.S. Cl. .................................... 156/425; 425/367
[58] Field of Search ............... 425/324.1, 325, 329, 425/367, 376 B, 377, 363, 367; 156/380.1, 327, 425

[56] References Cited

U.S. PATENT DOCUMENTS

| | | | |
|---|---|---|---|
| 140,934 | 7/1873 | Mayall | 156/425 |
| 1,151,096 | 8/1915 | French | 156/425 |
| 1,374,584 | 4/1921 | Knecht | 425/377 |
| 1,544,546 | 7/1925 | Baker | 156/425 |
| 3,015,133 | 1/1962 | Nichols | 264/209.1 |
| 3,202,560 | 8/1965 | Michael | 156/425 |
| 3,216,080 | 11/1965 | Norton | 425/377 |
| 3,363,042 | 1/1968 | Getman et al. | 425/377 |
| 3,640,656 | 2/1972 | Boguslawski | 425/377 |
| 3,730,795 | 5/1973 | Medney et al. | 156/425 |
| 4,028,164 | 6/1977 | Montagut | 156/446 |
| 4,063,838 | 12/1977 | Michael | 156/161 |
| 4,157,235 | 6/1979 | Lagabe et al. | 425/325 |
| 4,259,137 | 3/1981 | Kemmerling | 156/429 |
| 4,372,796 | 2/1983 | Greuel | 156/429 |

FOREIGN PATENT DOCUMENTS 57-075843  5/1982  Japan .................................. 425/325

Primary Examiner—Willard E. Hoag
Attorney, Agent, or Firm—Bucknam and Archer

[57] ABSTRACT

An apparatus for the production of rubber tubes on elongate horizontal cores comprises two pairs of drive heads mounted on structures capable of displacement upwardly and downwardly with respect to corresponding fixed bases. Between the drive heads there is positioned a bed of predetermined length carrying, with the interposition of suitable cushioning means, intermediate stands for supporting the cores. Adjacent the said bed, on either side, there is a respective ground bar, positioned substantially at floor, level for supporting and guiding carriages which are movable parallel to the bed.

3 Claims, 4 Drawing Sheets

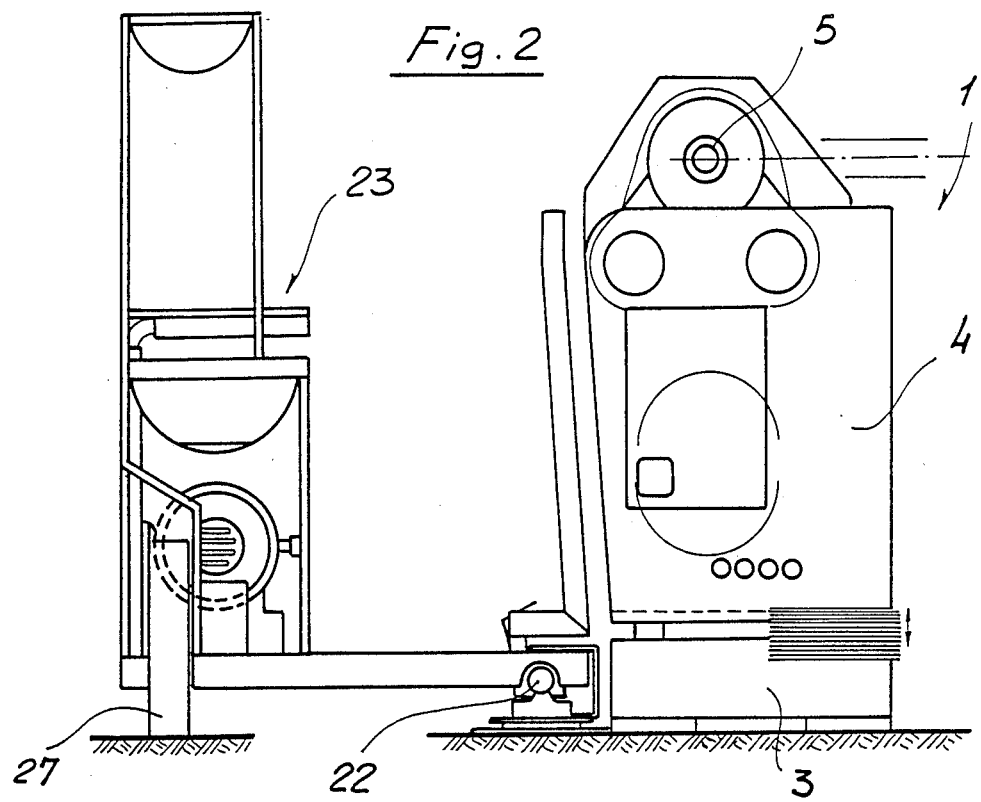
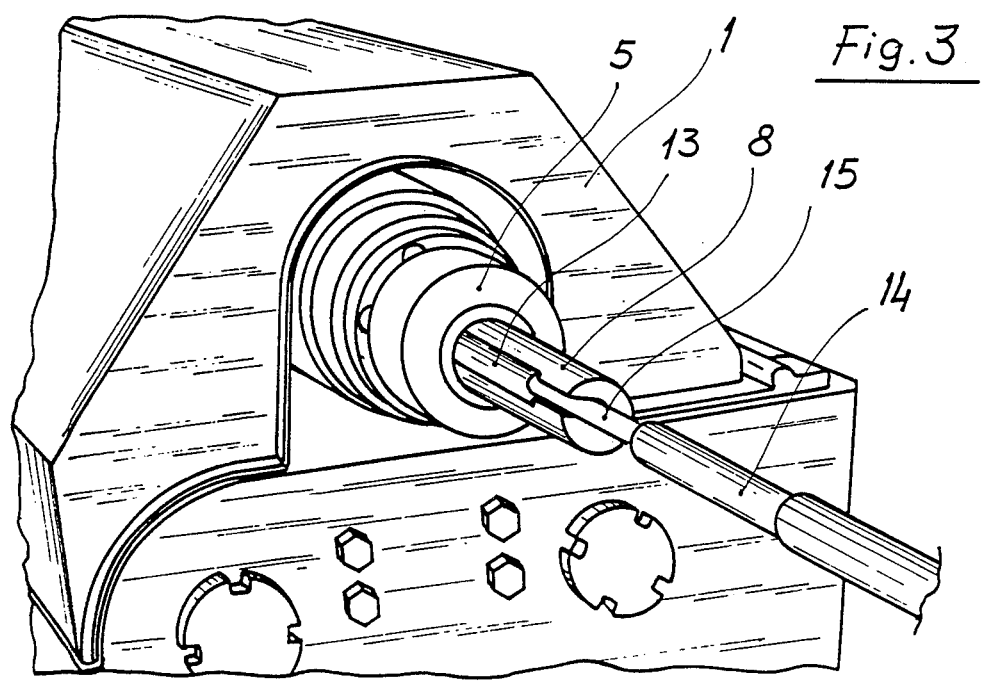

SYSTEM FOR THE PRODUCTION OF RUBBER TUBES

BACKGROUND OF THE INVENTION

Known apparatus for the production of rubber tubing in predetermined lengths substantially comprise a pair of rotary heads to which the ends of the cores are fixed, the cores being constituted by round bars, supported along their length by a plurality of fixed stands mounted on a suitable supporting structure or bed. In such known apparatus, given the length of the cores and the fixed height of the axes of rotation of the drive heads of the capstans, a correct operating process can only be obtained by utilising cores the radius of which is equal to the transverse distance between the axis of the said drive heads and the support surface of the stands.

Obviously, small differences from this theoretical radius can be admitted without causing excessive working inconveniences; but differences greater than a certain limit can cause an unwanted flexure of the end portions of the cores and, therefore, the risk of oscillation phenomena thereof.

If such oscillations happen it is essential to reduce, proportionately, the speed of rotation of the drive heads, with a corresponding reduction in the working capacity of the apparatus. Moreover, in current systems for the production of rubber tubes, the carriages which normally lie adjacent the beds, and which are utilised for applying the cladding or binding and/or for the introduction of reinforcing strips, fabrics, metal wires and the like, to tubes being produced, are usually carried by a pair of rollers slidable along U-shape guides fixed at the side of the supports of the beds themselves.

This type of support, however, is not able to eliminate the possibility of transverse oscillations of the carriages, with consequent detrimental effect on the accuracy of the operation of the process.

OBJECTS OF THE INVENTION

The primary aspect of the present invention is to overcome the disadvantages of the prior art apparatus by providing an apparatus or installation for the production of rubber tubes, which allows for the possibility of a continuous adjustment of the height of the axes of rotation of the rotary heads.

Another object of the present invention is to provide an apparatus for the production of rubber tubes, in which unwanted transverse oscillations of the carriages moving along the two sides of the bed do not occur.

A further object of the present invention is to provide an apparatus for the production of rubber tubes, in which there are provided means which prevent vibration of the stands which support the core from being transmitted onto the bed.

SUMMARY OF THE INVENTION

An apparatus for the production of rubber tubes comprises two horizontally extending cores on which the tubes are formed, including two pairs of drive heads mounted on driving structures capable of adjustment upwardly or downwardly with respect to corresponding fixed bases, a bed of predetermined length extending between the drive heads and carrying, with the interposition of cushioning means stands for supporting the cores along their length, and adjacent the bed, there being a ground bar positioned substantially at floor level for supporting carriages which in use of the system cooperate with the said drive heads. Various other features and advantages of the present invention will become more clearly apparent from a study of the following description in which reference is made to the accompanying drawings, provided purely by way of non limitative example.

BRIEF DESCRIPTION OF THE DRAWINGS

FIG. 2 is a schematic end view of one of the carriages adjacent the bed, and one of the driving structures supporting the drive heads;

FIG. 3 is a perspective view illustrating the coupling between one end of a core and a drive head;

DESCRIPTION OF THE PREFERRED EMBODIMENTS

Figure 1:
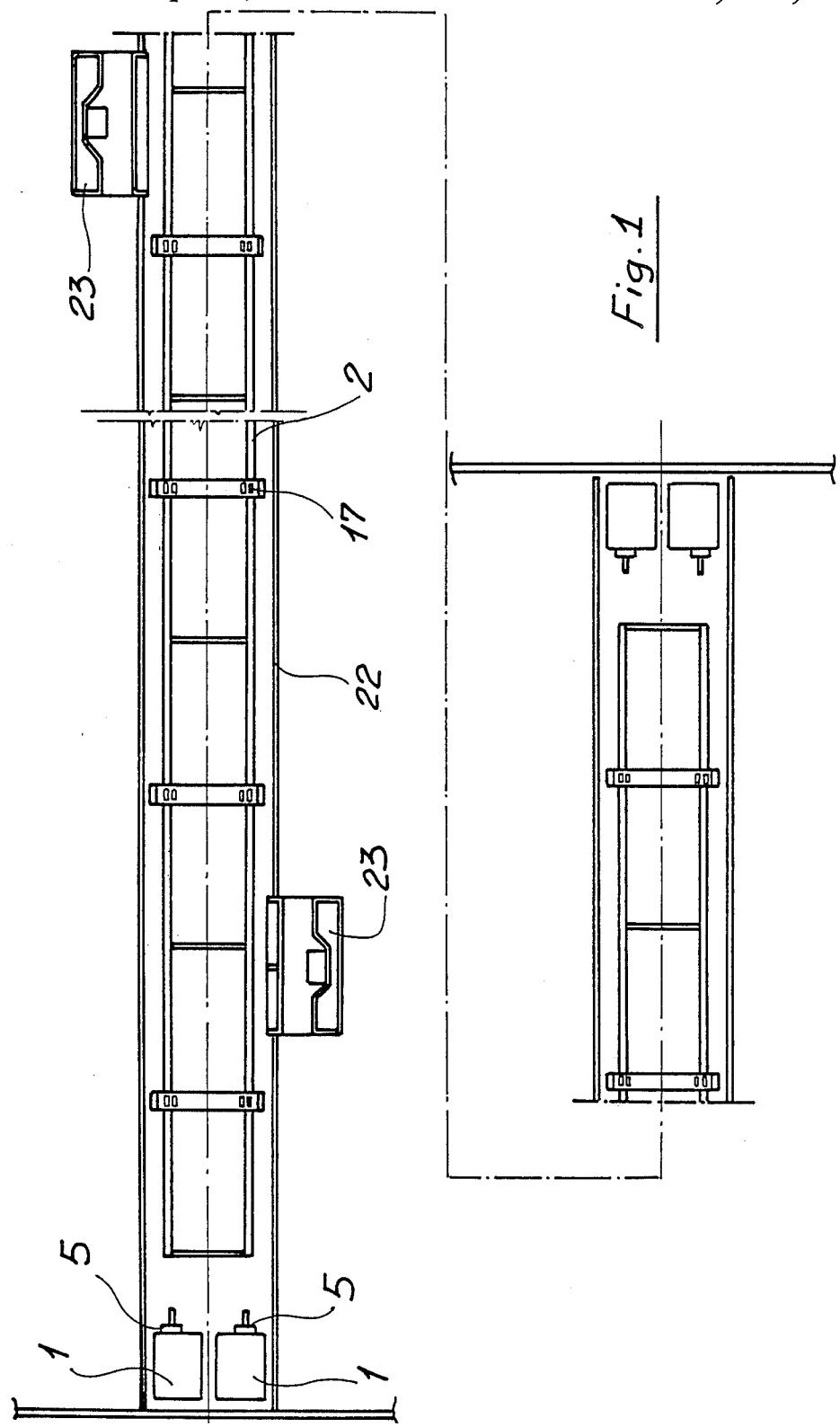
FIG. 1 is an schematic plan view of the bed of a apparatus for producing rubber tubes, showing the drive heads positioned at the two ends thereof.
Figure 4:
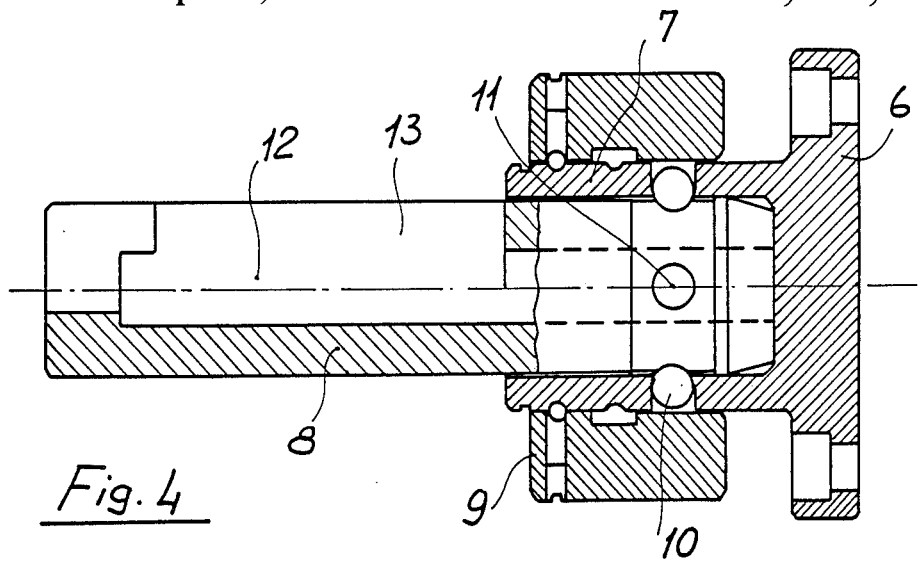
FIG. 4 is a longitudinal section showing the female attachment coupling of a drive head.
Figure 5:
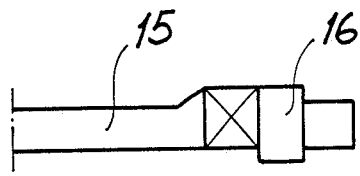
FIG. 5 is a side view of the male part of the attachment coupling, which is securely fixed to the ends of the said core.
Figure 6:
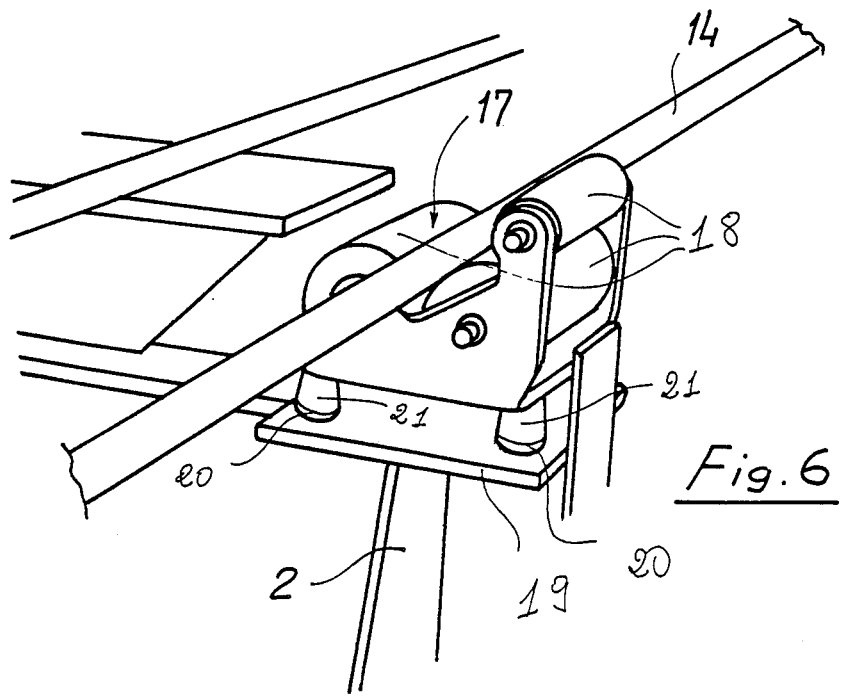
FIG. 6 is a perspective view showing one of the stands for the support of the cores.
Figure 7:
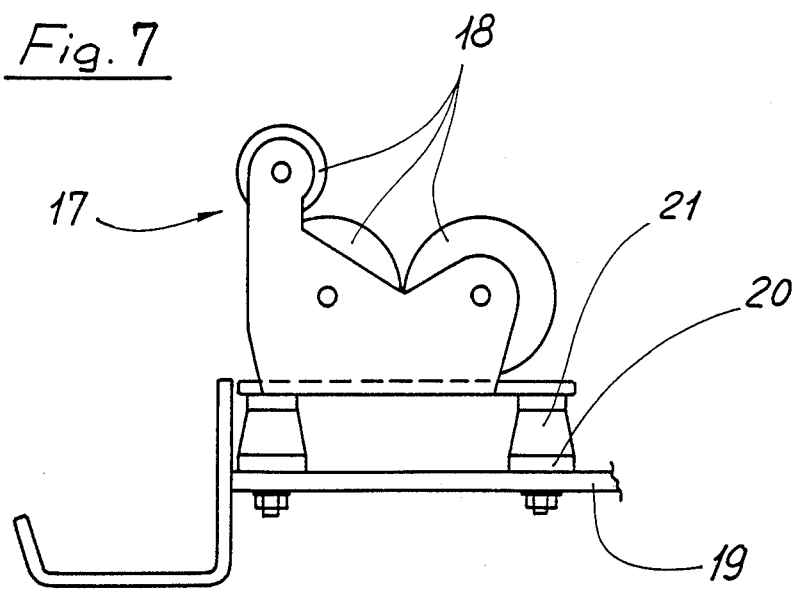
FIG. 7 is a side view of the stand shown in FIG. 6.
Figure 8:
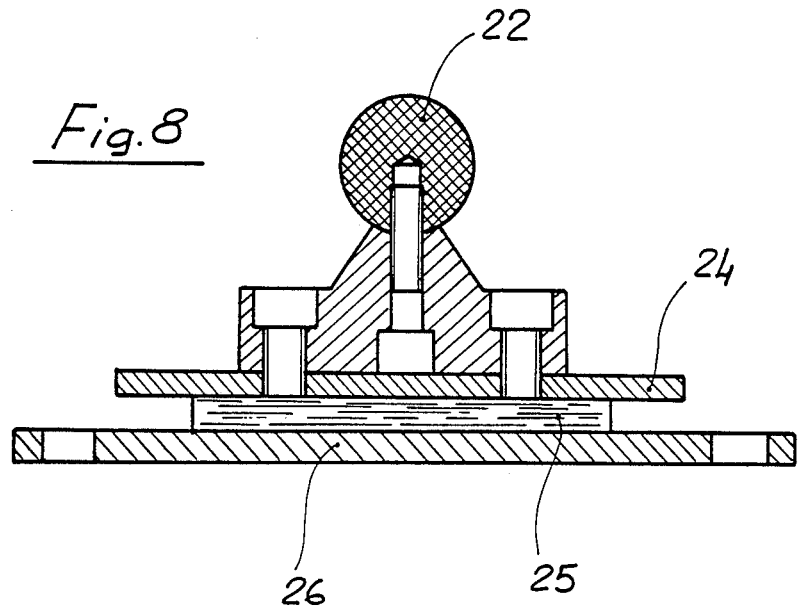
FIG. 8 is a transverse section of the carriage guide bar adjacent the bed.

With reference now to the drawings, the illustrated apparatus for the production of rubber tubes comprises two pairs of opposite driving structures, generally indicated with the reference numeral 1, between which is interposed a bed 2 the structure of which is formed substantially according to known constructional criteria. These driving structures 1 are each constituted by a fixed base 3 incorporating mechanical means for raising and lowering a movable structure 4 coupled thereto and carrying a pair of drive heads 5. The said mechanical means may be formed, for example, by vertical threaded spindles engaged by corresponding nuts put into rotation jointly via a chain by means of a geared motor unit, or by other functionally equivalent mechanisms.

The drive shaft of each said drive head carries a terminal flange to which is connected a flange 6 of a female coupling unit 7 within which is fitted a female attachment 8 firmly fixed thereto by the engagement of steel balls 10 in circumferentially spaced sockets 11, the balls 10 being housed in radial seats in the tubular body of the coupling unit 7 and being locked in position by an axially movable locking ring 9. The said female attachment 8 has a cylindrical seat 12 having differentiated sections open radially to the exterior through slot 13. The end of each core 14, in its turn, carries a male attachment 15 the free end 16 of which is shaped in such a way as to form, substantially, an eccentric disc. In practice the connection between the core 14 and the associated drive head is formed by inserting the end part of the core, which carries the aforesaid male attachment 15, laterally into the interior of the slot 13 formed in the female attachment.

In this way the two attachments, by the effect of the particular shape and an axial tension which can be applied by the drive heads, by means of appropriate pneumatic cylinders, are securely locked together thereby enabling rotary drive to be transmitted from the motor to the core. The said male and female attachments can of course be utilised for cores of any diameter.

The transverse distance between the axis of the drive heads 5 and the support surfaces of the stands 17 mounted at regular intervals on the bed 2 for the support of the cores themselves, can be adjusted at will at least within certain limits by operating to raise or to lower the heads by acting on the movable structure 4.

The said stands 17 are each provided with a set of three rollers 18 having horizontal axes, which are mounted on a supporting structure 19 rigidly connected to the bed 2 with the interposition of discs 20 of anti-vibrating material, and of rubber blocks 21. By this arrangement the vibrations and shocks generated in operation of the system are transmitted only to the stands, thereby saving the bed from oscillations and therefore allowing these to be made using lighter structural elements than are utilised for the production of beds for systems of conventional type.

At the foot of the bed 2 there is disposed, on each side, a tempered and ground guide bar 22 for the guidance of carriages 23 normally cooperating with the driving structures 1 for the production of tubes. This bar is mounted on a support resting on an anti-vibrating plate 24 which, with the interposition of a neoprene or like disc 25 is supported by a base plate 26 also of anti-vibrating material. This ground bar guides the said carriages 23, which roll on a pair of rubber wheels 27, in such a way that these translate parallel to the bed without subjecting it to even the slightest transverse vibration.

What is claimed is:

1. An apparatus for the production of rubber tubes comprising: a pair of horizontally extending cores on which said rubber tubes are formed, a pair of opposite driving structures having fixed bases, two pairs of opposite drive heads, with each drive head pair mounted in an adjoining relationship on a respective driving structure, means mounting said drive heads on said driving structures in an adjustable manner allowing adjustment of said drive heads upwardly and downwardly with respect to corresponding said fixed bases of said driving structures, means defining a bed of predetermined length extending between said drive heads, said bed carrying stands for supporting said cores along their length, guide bar means positioned substantially at floor level adjacent said bed, and a plurality of sliding carriages supported and guided by said guide bar means, said carriages cooperating with said drive heads for supporting said cores and the rubber tubes formed thereon, each said drive head having a drive shaft carrying a terminal flange, a coupling unit being connected to said flange, a female attachment unit being connected to said coupling unit by axial displacement of a connecting ring locking steel balls within corresponding seatings formed circumferentially around said attachement, said female attachment being provided with a coaxial inner cylindrical seat having a slotted section open radially to the exterior, and a male attachment unit having a free end which is shaped in such a way as to form an eccentric disc engageable in said female attachment unit.

2. An apparatus according to claim 1, wherein said stands each substantially comprise a set of three rollers having horizontal axes, a supporting structure rigidly connected to said bed carrying said rollers, and a disc of anti-vibrating material and a rubber block interposed between said stand and said supporting structure.

3. An apparatus according to claim 1 for the production of rubber tubes, wherein there is provided a said guide bar at the foot of said bed on each side thereof, respective said carriages being slidingly movable along respective said guide bars in supported relation thereon, support means carried on vibration-absorbing base plate means supporting each said guide bar, and at least one resilinet disc interposed between said base plate means and said support means.

* * * * *